US008538262B2

(12) United States Patent
Beckett et al.

(10) Patent No.: US 8,538,262 B2
(45) Date of Patent: Sep. 17, 2013

(54) COLOR FREE WDM PON BASED ON BROADBAND OPTICAL TRANSMITTERS

(75) Inventors: Douglas Beckett, Kanata (CA); Bin Cao, Kanata (CA); Rong Chen, Ottawa (CA)

(73) Assignee: LG-Ericsson Co., Ltd., Seoul (KR)

( * ) Notice: Subject to any disclaimer, the term of this patent is extended or adjusted under 35 U.S.C. 154(b) by 590 days.

(21) Appl. No.: 12/558,848

(22) Filed: Sep. 14, 2009

(65) Prior Publication Data

US 2011/0064410 A1 Mar. 17, 2011

(51) Int. Cl.
*H04J 14/02* (2006.01)
(52) U.S. Cl.
USPC .................................. 398/63; 398/79; 398/87
(58) Field of Classification Search
USPC ................................. 398/63, 79, 87
See application file for complete search history.

(56) References Cited

U.S. PATENT DOCUMENTS

| 5,568,310 | A  | * | 10/1996 | Naito ........................... 359/341.1 |
| 5,715,076 | A  | * | 2/1998  | Alexander et al. ............... 398/87 |
| 7,440,701 | B2 |   | 10/2008 | Li et al. |
| 7,493,042 | B2 |   | 2/2009  | Li et al. |
| 7,965,944 | B2 |   | 6/2011  | Li et al. |
| 8,116,628 | B2 |   | 2/2012  | Lee et al. |
| 2002/0159116 | A1 | * | 10/2002 | Shiozaki et al. ............... 359/124 |
| 2008/0231943 | A1 | * | 9/2008  | Sorin et al. ..................... 359/336 |
| 2009/0185807 | A1 | * | 7/2009  | Lee et al. ........................ 398/72 |

OTHER PUBLICATIONS

Office Action for U.S. Appl. No. 12/533,028 dated Feb. 27, 2012.

* cited by examiner

*Primary Examiner* — Danny Leung
(74) *Attorney, Agent, or Firm* — KED & Assocoiates, LLP

(57) ABSTRACT

A Wavelength Division Multiplexed Passive Optical Network (WDM-PON) includes a plurality of broadband light sources, each broadband light source being connected to receive a respective data signal and generating a corresponding modulated broadband optical signal. An Array Waveguide Grating (AWG) is connected for receiving each modulated broadband optical signal through a respective branch port and for generating a filtered broadband signal. The AWG implements a filter function comprising a respective pass-band associated with each branch port such that the filtered broadband signal exhibits a respective intensity peak associated with each pass-band. Each intensity peak is modulated with data from a respective one of the broadband light sources. A bandwidth of the respective modulated broadband optical signal generated by each broadband light source is at least equal to the width of a channel-band of the AWG.

14 Claims, 4 Drawing Sheets

COLOR FREE WDM PON BASED ON BROADBAND OPTICAL TRANSMITTERS

CROSS-REFERENCE TO RELATED APPLICATIONS

This is the first application filed in respect of the present application.

FIELD OF THE INVENTION

The present application relates generally to Wavelength Division Multiplexed Passive Optical Networks (WDM PON) and, more specifically, to a color free WDM PON based on broadband optical transmitters.

BACKGROUND OF THE INVENTION

A time-division multiplexed (TDM) passive optical network (PON) is a point-to-multipoint network architecture in which unpowered optical splitters are used to enable a single optical fibre to serve multiple premises. A TDM-PON typically includes an Optical Line Terminal (OLT) at the service provider's central office connected to a number (typically 32-128) of Optical Network Terminals (ONTs), each of which provides an interface to customer equipment.

In TDM-PON operation, downstream signals are broadcast from the OLT to the ONTs on a shared fibre network. Various techniques, such as encryption, can be used to ensure that each ONT can only receive signals that are addressed to it. Upstream signals are transmitted from each ONT to the OLT, using a multiple access protocol, such as time division multiple access (TDMA), to prevent "collisions".

A Wavelength Division Multiplexed PON, or WDM-PON, is a type of passive optical network in which multiple optical wavelengths are used to create multiple point-to-point connections and increase the upstream and/or downstream bandwidth available to end users. Instead of an optical power splitter, unpowered optical wavelength multiplexers and de-multiplexers are used. Data encryption is optional, since WDM-PON channels are physically separated by wavelength, and each ONT only receives the data that is intended for it. FIG. 1 is a block diagram illustrating a typical WDM-PON system. As may be seen in FIG. 1, the OLT 4 comprises a plurality of transceivers 6, each of which includes a light source 8 and a detector 10 for sending and receiving optical signals on respective wavelength channels, and an optical combiner/splitter 12 for combining light from/to the light source 8 and detector 10 onto a single optical fibre 14. The light source 8 may be a conventional laser diode such as, for example, a distributed feed-back (DFB) laser, for transmitting data on the desired wavelength using either direct laser modulation, or an external modulator (not shown) as desired. The detector 10 may, for example, be a PIN diode for detecting optical signal received through the network. An optical mux/demux 16 (such as, for example, a Thin-Film Filter—TFF) is used to couple light between each transceiver 6 and an optical fibre trunk 18, which may include one or more passive optical power splitters (not shown).

A passive remote node 20 serving one or more customer sites includes an optical mux/demux 22 for demultiplexing wavelength channels from the optical trunk fibre 18. Each wavelength channel is then routed to an appropriate branch port 24 which supports a respective WDM-PON branch 26 comprising one or more Optical Network Terminals (ONTs) 28 at respective customer premises. Typically, each ONT 28 includes a light source 30, detector 32 and combiner/splitter 34, all of which are typically configured and operate in a manner mirroring that of the corresponding transceiver 6 in the OLT 4.

Typically, the wavelength channels of the WDM-PON are divided into respective channel groups, or bands, each of which is designated for signalling in a given direction. For example, C-band (e.g. 1530-1565 nm) channels may be allocated to uplink signals transmitted from each ONT 28 to the OLT 4, while L-band (e.g. 1565-1625 nm) channels may be allocated to downlink signals from the OLT 4 to the ONT(s) 28 on each branch 26. In such cases, the respective optical combiner/splitters 12,34 in the OLT transceivers 6 and ONTs 28 are commonly provided as passive optical filters well known in the art.

The WDM-PON illustrated in FIG. 1 is known, for example, from "Low Cost WDM PON With Colorless Bidirectional Transceivers", Shin, D J et al, Journal of Lightwave Technology, Vol. 24, No. 1, January 2006. With this arrangement, each branch 26 is allocated a predetermined pair of wavelength channels, comprising an L-band channel for downlink signals transmitted from the OLT 4 to the branch 26, and a C-band channel for uplink signals transmitted from the ONT(s) 28 of the branch 26 to the OLT 4. The MUX/DEMUX 16 in the OLT 4 couples the selected channels of each branch 26 to a respective one of the transceivers 6. Consequently, each transceiver 6 of the ONT is associated with one of the branches 26, and controls uplink and downlink signalling between the ONT 4 and the ONT(s) 28 of that branch 26. Each transceiver 6 and ONT 28 is rendered "colorless", by using reflective light sources 8, 30, such as reflective semi-conductor optical amplifiers; injection-locked Fabry-Perot lasers; reflective electro-absorptive modulators; and reflective Mach-Zehnder modulators. With this arrangement, each light source 8, 30 requires a "seed" light which is used to produce the respective downlink/uplink optical signals. In the system of FIG. 1, the seed light for downlink signals is provided by an L-band broadband light source (BLS) 36 via an L-band optical circulator 38. Similarly, the seed light for uplink signals is provided by a C-band broadband light source (BLS) 40 via a C-band optical circulator 42.

As may be seen in FIGS. 2a and 2b, each of the broadband light sources (BLSs) 36, 40 may be constructed in a variety of different ways. In the BLS of FIG. 2a, a set of narrow-band lasers 44 are used to generate respective narrow band seed lights 46, each of which is tuned to the center wavelength of a respective channel of the WDM-PON. A multiplexer 48 combines the narrow-band seed lights 46 to produce a WDM seed light 50, which is then distributed through the WDM-PON to either the ONTs 26 (in the case of C-band seed light) or the transceivers 6 (in the case of L-Band seed light). If desired, each of the narrow-band lasers 44 may be provided as conventional distributed feedback (DFB) semiconductor laser diodes. Alternatively, multi-channel quantum dot lasers can be used, in which case the number of different laser diodes needed to produce all of the narrow-band seed lights is reduced. Multi-channel quantum dot based lasers are known in the art. In some embodiments, a single multi-channel quantum dot laser may be used to generate all of the desired narrow-band seed lights, in which case the multiplexer 48 is not required.

In the BLS of FIG. 2b, the broadband light source (BLS) is provided by a continuous light source 52 such as a Superluminescent Light Emitting Diode (SLED) that produces a continuous spectrum of light across a wide range of wavelengths. A comb filter 54 generates the desired WDM seed light 50 by filtering the continuous spectrum light emitted by the SLED 52.

In both of the BLSs of FIGS. 2a and 2b, an optical amplifier 58 (for example an Erbium Doped Fiber Amplifier (EDFA)) can be used to amplify the WDM seed light 50. This arrangement is useful for increasing link budget (and thus signal reach), particularly for uplink signals for which the light must traverse the WDM PON twice.

The system of FIGS. 1 and 2 is advantageous in that the light sources 8, 30 are colorless. As a result, a common transceiver configuration can be used for every channel, which facilitates reduced costs via economies of scale and reduced administration However, the requirement for L-band and C-band seed light BLSs and optical circulators tends to increase cost and complexity of the ONT, and so at least partially offsets the benefits of using colorless light sources. In addition, the location of the C-band BLS 40 in the OLT 4 means that light of the uplink signals must traverse the WDM-PON twice, so that the uplink signals received by the transceivers 6 are subject to "round-trip" attenuation. By contrast, light of the downlink signals only traverse the WDM-PON once, and so will inherently require lower BLS power. This implies that the in the performance of the WDM-PON as a whole will be limited by the signal reach of the uplink signals.

SUMMARY OF THE INVENTION

An aspect of the present invention provides a Wavelength Division Multiplexed Passive Optical Network (WDM-PON) includes a plurality of broadband light sources, each broadband light source being connected to receive a respective data signal and generating a corresponding modulated broadband optical signal. An Array Waveguide Grating (AWG) is connected for receiving each modulated broadband optical signal through a respective branch port and for generating a filtered broadband signal. The AWG implements a filter function comprising a respective pass-band associated with each branch port such that the filtered broadband signal exhibits a respective intensity peak associated with each pass-band. Each broadband light source is modulated with data such that, after filtering, each intensity peak is modulated with the data from one broadband light source associated with each pass-band. A bandwidth of the respective modulated broadband optical signal generated by each broadband light source is at least equal to the width of a channel-band of the WDM-PON.

An advantage of the present invention is that identical broadband light sources can be used to transmit modulated optical signals for all of the channels within a given channel band (e.g. L-band or C-band) of the WDM PON. Thus a color-free WDM-PON can be constructed without requiring high cost injection locked lasers and seed light sources.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for providing colourless WDM-PON without injection seeding. A representative embodiment is described below with reference to FIGS. 3-4.

As is known in the art, an Array-Waveguide Grating (AWG) is capable of demultiplexing a plurality of wavelength channels from Wavelength Division Multiplexed (WDM) signal received through a WDM port, and outputting each demultiplexed wavelength channel though a respective one of a plurality of branch ports. Within the free spectral range (FSR) of the AWG there is a unique relationship between channel wavelength and each branch port. That is, a given optical channel will be coupled between the WDM port and a unique one of the branch ports. An AWG also performs the reciprocal operation, so that optical channels received through the branch ports are multiplexed into a WDM signal which is output through the WDM port.

In very general terms, the present invention exploits the above-described characteristics of AWGs to facilitate low-cost high performance color free WDM-PON using low cost directly driven broadband light sources. More particularly, the AWG effectively implements a filter function characterised by a respective pass-band centered at each channel wavelength of the WDM. Each pass-band is associated with a respective branch port, so that light of a given WDM PON channel is coupled between the WDM port and the associated branch port. Parameters of the filter function (e.g. filter bandwidth of each channel pass-band, and channel-to-channel isolation) are governed by the design and construction of the AWG. Typically, these parameters are selected to minimize optical losses of channel signals traversing the AWG, with the assumption that the channel signals themselves have well controlled center wavelength and bandwidth.

In accordance with the present invention, the AWG filter function is designed such that each channel signal is generated by filtering a respective received broadband light, and inter-channel cross-talk is balanced against increased relative intensity noise (RIN).

Figure 1:
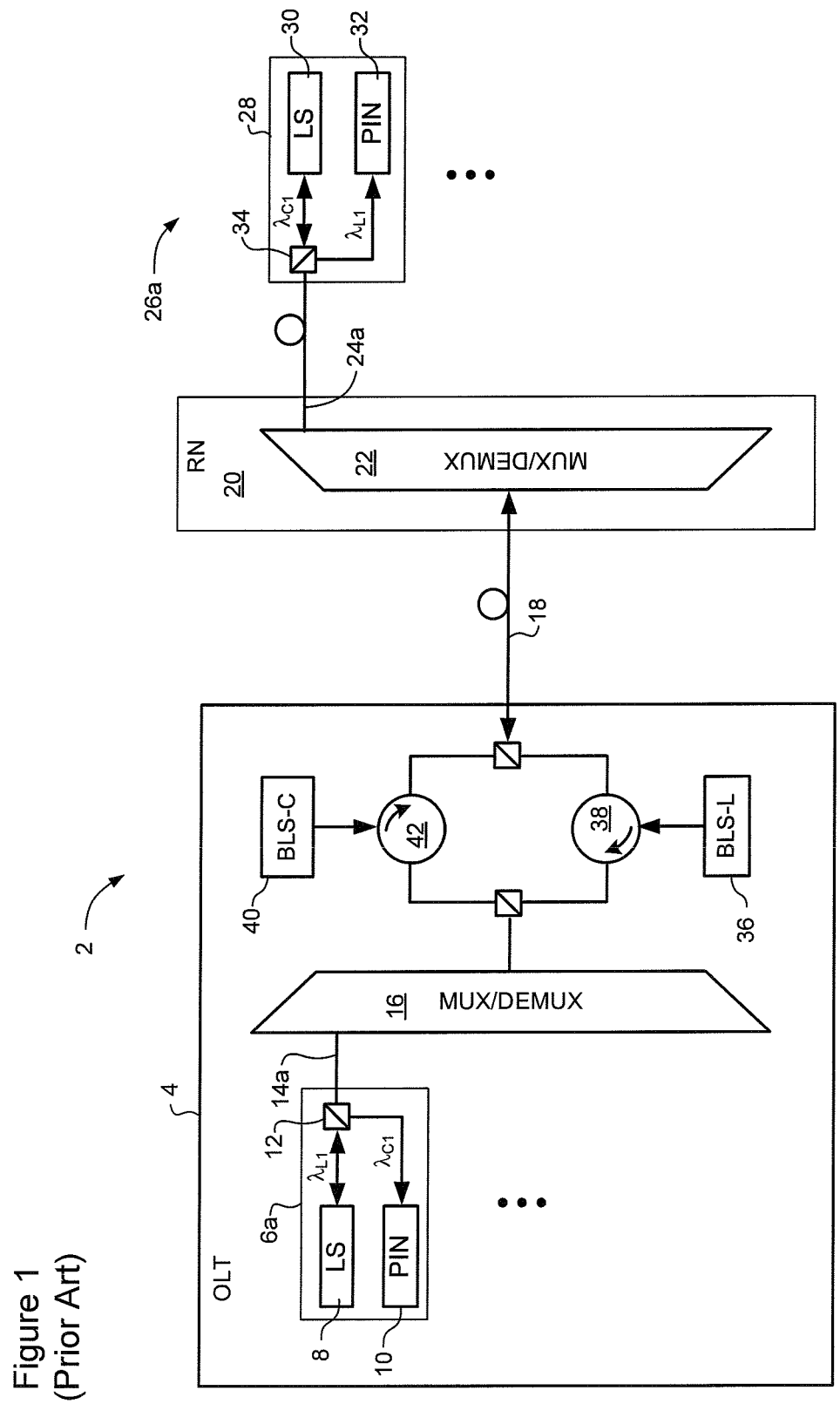
FIG. 1 schematically illustrates a conventional WDM-PON known in the prior art.
Figure 2A:
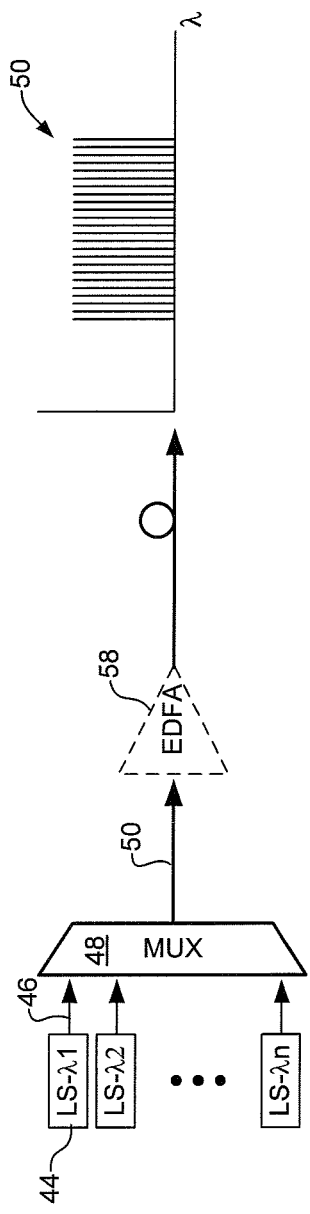
FIGS. 2a and 2b schematically illustrate respective conventional broadband light sources that may be used to general seed light in the WDM-PON of FIG. 1.
Figure 2B:
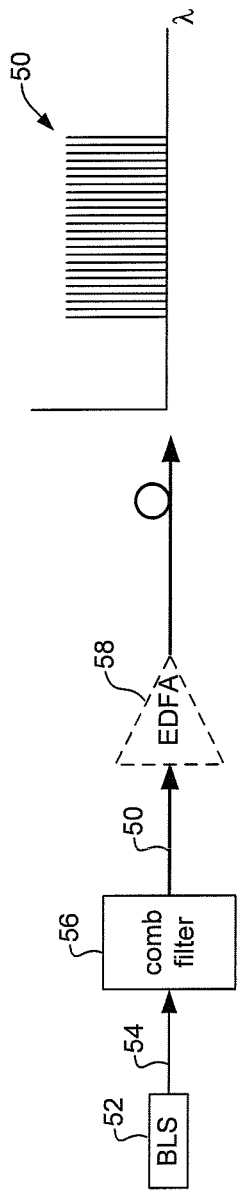
Figure 3A:
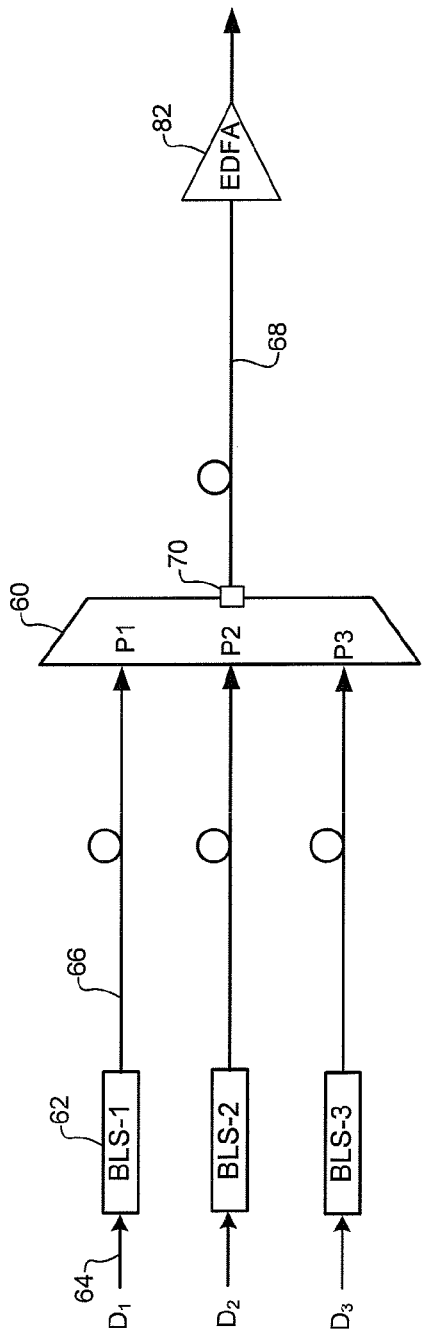
FIG. 3a-3d schematically illustrate light generation and filtering functions in accordance with aspects of the present invention.

For example, FIGS. 3a-d illustrates operation of a representative AWG 60 constructed in accordance with the present invention. In the embodiment of FIG. 3a, a set of three broadband light sources 62 (such as, for example, Light Emitting Diodes, LEDs) are directly driven using a respective data signal 64 to generate a corresponding intensity modulated broadband light 66. Each modulated broadband light 66 is supplied to a respective branch port P1-P3 of the AWG 60, which outputs a filtered broadband light 68 through the WDM port 70 of the AWG 60.

Figure 3D:
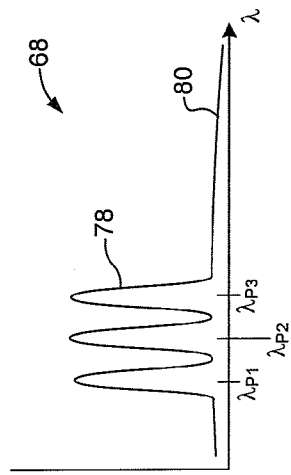
Figure 3C:
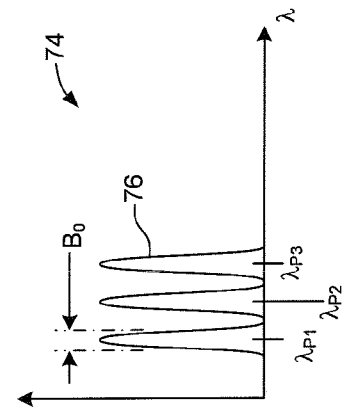
Figure 3B:
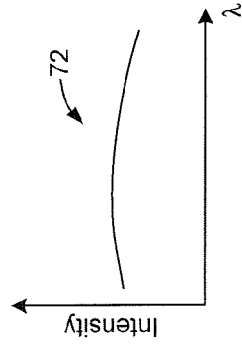

FIG. 3b illustrates a typical output spectrum 72 of each broadband light sources 62. Preferably, the broadband light sources 62 are of common design, so that the output spectrum 72 of all of the broadband light sources 62 will be closely similar. Preferably, the output spectrum 72 is at least as broad as one channel band of the WDM PON, so that a common broadband light source configuration can be used to source any channel within a given channel band. Ideally, the output spectrum 72 of each broadband light source is flat across at least the channel band, so as to minimize intensity variations between channels. However, this is not essential. At least some variation in channel intensity is tolerable, and, if desired, known methods of optical channel equalization may be used.

FIG. 3c illustrates the filter function 74 of the AWG 60. As may be seen in each FIG. 3c, the AWG filter function 74 comprises a respective pass-band 76 associated with each branch port of the AWG 60. Each passband 76 has a center wavelength λ and a filter channel bandwidth $B_0$, both of which can be selected, as desired, by the design of the AWG 60. Thus, branch port P1 is associated with a pass-band 76 centered at $\lambda_{P1}$, branch port P2 is associated with a pass-band 76 centered at $\lambda_{P2}$, and branch port P3 is associated with a pass-band 76 centered at $\lambda_{P3}$. As will be described in greater detail below, each pass-band 76 effectively defines a respective channel of the WDM-PON. Thus, the center wavelength λ of each passband 76 is selected based on the desired spectral grid of the WDM-PON, and the filter channel bandwidth $B_o$ selected to minimize channel cross-talk and Relative Intensity Noise (RIN) within each channel. For example, for downlink signals, the AWG 60 may be designed to implement a filter function 74 characterised by passbands 76 that correspond with a grid of L-band channels on a 100 GHz spacing and a filter channel bandwidth $B_0$ of 60 GHz.

FIG. 3d illustrates the filtered broadband light 68 output through the WDM port 70 of the AWG 60. As may be seen in FIG. 3d, the filtered broadband light 68 comprises a respective intensity peak 78 corresponding to each passband 76 of the AWG filter function 74, and a noise floor 80 comprising out-of-band light from each broadband light source 62 that has leaked through the AWG 60. Each of the intensity peaks 78 in the filtered broadband light 68 is modulated with data from a respective one of the broadband light sources 62, and thus constitutes a corresponding channel signal of the WDM PON. The noise floor 80 is a composite of leakage light from all of the branch ports P1-P3, and thus contains modulation components of all broadband light sources 62. If desired, this characteristic of the noise floor 80 may be used to implement electronic noise cancellation techniques to improve the signal to noise ratio.

The filtered broadband light 68 has a Relative Intensity Noise (RIN) of approximately $1/B_0$. RIN decreases with increasing filter channel bandwidth $B_0$, which favours designing the AWG 60 with the largest possible $B_0$. However, as $B_0$ increases, the tails of adjacent passbands increasingly overlap, which results in increased cross-talk between adjacent channels. Consequently, the optimum $B_0$, at which transmission bit error rate (BER) is a minimum, is a balance between RIN and inter-channel cross-talk.

If desired, Forward Error Correction (FEC) encoding of each data signal 64 may be used to improve the BER of each channel signal beyond that which can be obtained by optimizing $B_0$.

In each unneeded light source 62, the optical power of each intensity peak 78 of the filtered broadband light 68 will be lower than that of corresponding optical channel signals generated by, for example, injection locked light sources (such as injection locked Fabry-Perot lasers). Accordingly, in order to obtain desired signal reach, an optical amplifier 82 (such as an Erbium Doped Fibre Amplifier, EDFA) may be used to amplify the filtered broadband light 68. However, in this case, the filter gain is preferably optimized in view of the fact that an optical amplifier will amplify both the noise floor and ASE in addition to the intensity peaks.

Figure 4:
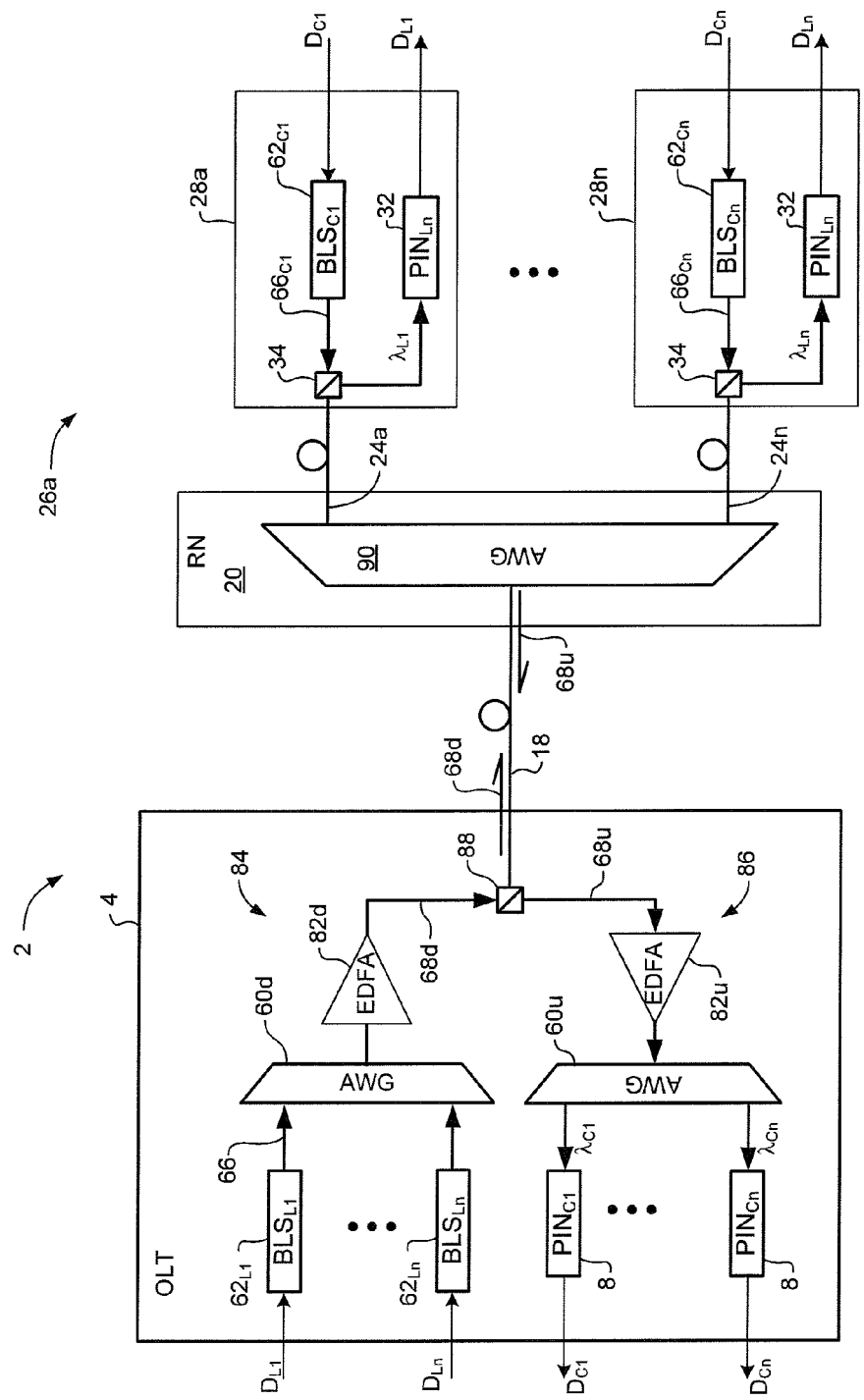
FIG. 4 schematically illustrates a representative WDM-PON in accordance with an embodiment of the present invention.

Referring to FIG. 4, a representative WDM-PON that implements techniques in accordance with the present invention is schematically illustrated. In the embodiment of FIG. 4, the OLT 4 comprises an uplink path 86 and a downlink path 84, both of which are coupled to the trunk fibre 18 via an optical splitter/combiner 88. The downlink path 84 includes a respective L-band broadband light source $64_{L1}$-$62_{Ln}$ for each downlink channel of the WDM-PON. Each BLS 62 is directly driven by a respective downlink data signal $D_{L1}$-$D_{Ln}$ to generate a respective intensity modulated broadband light $66_{L1}$-$66_{Ln}$. A downlink AWG 60d then filters and combines the broadband lights 66, as described above with reference to FIGS. 3a-d, to generate a downlink filtered broadband light 68d including intensity peaks 78 (FIG. 3d) modulated with data from each of the broadband light sources $62_{L1}$-$62_{Ln}$. In the embodiment of FIG. 4, the spacing between the intensity peaks 78 of the downlink filtered broadband light 68d follows a standard L-band spectral grid. This is advantageous in that standard passive filter-based optical devices can be used for routing each intensity peak through the WDM-PON to the appropriate ONTs 28. A downlink EDFA 82d amplifies the downlink filtered broadband light 68d to improve signal reach, as described above.

The optical splitter/combiner 88, which may be provided as a passive filter-based optical coupler, injects the downlink filtered broadband light 68d into the trunk fibre 18 for transmission to the ONTs 28. At the remote node 20, an AWG 90 demultiplexes the downlink filtered broadband light 68d, and couples each intensity peak 78 to a corresponding branch port 24 for transmission to a respective ONT 28 in a conventional manner Within each ONT 28, a conventional filter-based, optical splitter 34 may be used to separate the downlink intensity peak received from the remote node 20 to a receiver 32 (which may, for example include a PIN diode) for detection and reception of the downlink data signal Dx modulated onto the received intensity peak.

As may be seen in FIG. 4, each ONT 28a-28n also includes a C-band broadband light source ($BLS_{C1}$-$BLS_{Cn}$) which is directly driven by a respective data signal $D_{C1}$-$D_{Cn}$ to generate a respective intensity modulated uplink broadband light $66_{C1}$-$66_{Cn}$. The respective intensity modulated uplink broadband lights 66 from all of the ONTs 28 are filtered and combined by the remote node AWG 90, as described above with reference to FIGS. 3a-d, to generate an uplink filtered broadband light 68u which includes a respective intensity peak modulated with uplink data from each ONT 24. In the embodiment of FIG. 4, the intensity peaks of the uplink filtered broadband light 68u follows a standard C-band spectral grid. The uplink filtered broadband light 68u is conveyed through the fibre trunk 18 from the remote node 20 to the OLT 4.

At the OLT 4, the optical splitter/combiner 88 couples the uplink filtered broadband light 68u into the OLT's uplink path 86, which includes an uplink optical amplifier 82u cascaded with an Uplink AWG 60u. The Uplink AWG 60u demultiplexes the uplink filtered broadband light 68u, and couples each intensity peak to a corresponding branch port for transmission to a respective receiver 8 (which may, for example, include a PIN diode) for detection and reception of the uplink data signals $D_{C1}$-$D_{C2}$ In the embodiment described above with reference to FIGS. 3-4, the downlink and uplink filtered broadband lights 68d and 68u include intensity peaks that respectively correspond with standard L-Band and C-Band spectral grids, and a passive filter-based optical splitter/combiner 88 is used to couple the downlink filtered broadband light 68d into the fibre trunk 18, and couple the uplink filtered broadband light 68u into the OLT's uplink path 86. However, it will be appreciated that this arrangement is not essential. Other implementations can be designed without departing from the scope of the appended claims.

The embodiments of the invention described above are intended to be illustrative only. The scope of the invention is therefore intended to be limited solely by the scope of the appended claims.

We claim:

1. A Wavelength Division Multiplexed Passive Optical Network (WDM-PON) comprising:
   a plurality of broadband light sources each for a respective channel of the WDM-PON, each broadband light source being connected to receive a respective data signal and to generate a corresponding modulated broadband optical signal; and
   an Array Waveguide Grating (AWG) for receiving each modulated broadband optical signal through a respective one of a plurality of branch ports and for providing a filtered broadband signal based on the received modulated broadband optical signals, the AWG having a filter function that includes a plurality of pass-bands with each respective pass-band associated with a separate one of the plurality of branch ports such that the filtered broadband signal exhibits a respective intensity peak associated with each of the plurality of pass-bands, and wherein each respective pass-band separately includes a center wavelength and a filter channel bandwidth to form the respective intensity peak at each channel wavelength, and the AWG provides the filtered broadband signal having a plurality of intensity peaks modulated with data from the plurality of broadband light sources;
   wherein a width of a bandwidth of the respective modulated broadband optical signal generated by each of the plurality of broadband light sources is equal to or greater than a width of a channel-band of the WDM-PON.

2. The network as claimed in claim 1, wherein the AWG selects the filter channel bandwidth of each pass-band based on a Relative Intensity Noise (RIN) of the corresponding pass-band and inter-channel cross-talk within the filtered broadband signal.

3. The network as claimed in claim 1, wherein a spacing between adjacent channel pass-bands of the AWG filter function follows a predetermined spectral grid.

4. The network as claimed in claim 3, wherein the predetermined spectral grid is wider than a set of channels for conveying downlink signals of the WDM PON.

5. The network as claimed in claim 3, wherein the predetermined spectral grid is wider than a set of channels for conveying uplink signals of the WDM PON.

6. The network as claimed in claim 1, further comprising an optical amplifier for amplifying the filtered broadband signal provided by the AWG.

7. The network as claimed in claim 1, wherein the respective data signal supplied to each broadband light source is Forward Error Correction (FEC) encoded.

8. In a Wavelength Division Multiplexed Passive Optical Network (WDM-PON), a method of generating optical channel signals, the method comprising:
   each one of a plurality of broadband light sources receiving a respective data signal and generating a corresponding modulated broadband optical signal having a width of a bandwidth that is equal to or greater than a width of a channel-band of the WDM-PON each of the plurality of light sources separately corresponding to a respective channel of the WDM-PON; and
   an Array Waveguide Grating (AWG) receiving each modulated broadband optical signal through a respective one of a plurality of branch ports and providing a filtered broadband signal based on the received modulated broadband optical signals;
   wherein the AWG has a filter function that includes a plurality of pass-bands with each respective pass-band associated with a separate one of the plurality of branch ports such that the filtered broadband signal exhibits a respective intensity peak associated with each of the plurality of pass-bands, and wherein each respective pass-band separately includes a center wavelength and a filter channel bandwidth to form the respective intensity peak, and the AWG provides the filtered broadband signal having a plurality of intensity peaks modulated with data from the plurality of broadband light sources.

9. The method as claimed in claim 8, wherein the AWG selects the filter channel bandwidth of each pass-band based on a Relative Intensity Noise (RIN) of the corresponding pass-band and inter-channel cross-talk within the filtered broadband signal.

10. The method as claimed in claim 8, wherein a spacing between adjacent channel pass-bands of the AWG filter function follows a predetermined spectral grid.

11. The method as claimed in claim 10, wherein the predetermined spectral grid is wider than a set of channels for conveying downlink signals of the WDM PON.

12. The method as claimed in claim 10, wherein the predetermined spectral grid is wider than a set of channels for conveying uplink signals of the WDM PON.

13. The method as claimed in claim 8, further comprising amplifying the filtered broadband signal provided by the AWG by using an optical amplifier.

14. The method as claimed in claim 8, wherein the respective data signal supplied to each broadband light source is Forward Error Correction (FEC) encoded.

* * * * *